No. 659,996. Patented Oct. 16, 1900.
G. R. YOUNG.
HOSE REEL.
(Application filed Feb. 12, 1900.)
(No Model.)

WITNESSES:
Geo. W. Naylor
C. R. Ferguson

INVENTOR
George R. Young
BY
ATTORNEYS

THE NORRIS PETERS CO., PHOTO-LITHO., WASHINGTON, D. C.

United States Patent Office.

GEORGE REED YOUNG, OF MEMPHIS, TENNESSEE.

HOSE-REEL.

SPECIFICATION forming part of Letters Patent No. 659,996, dated October 16, 1900.

Application filed February 12, 1900. Serial No. 4,993. (No model.)

*To all whom it may concern:*

Be it known that I, GEORGE REED YOUNG, a citizen of the United States, and a resident of Memphis, in the county of Shelby and State of Tennessee, have invented a new and Improved Hose-Reel, of which the following is a full, clear, and exact description.

This invention relates to improvements in reels for hose used for fire-extinguishers or other purposes; and the object is to provide a reel the hose on which is connected with a water-supply, the turning of the reel to unwind the hose causing a water-controlled valve to be opened, permitting the water to pass from the supply to the hose, the reel operating to close the valve when turned to wind the hose.

I will describe a hose-reel embodying my invention and then point out the novel features in the appended claims.

Reference is to be had to the accompanying drawings, forming a part of this specification, in which similar characters of reference indicate corresponding parts in all the figures.

Figure 1:
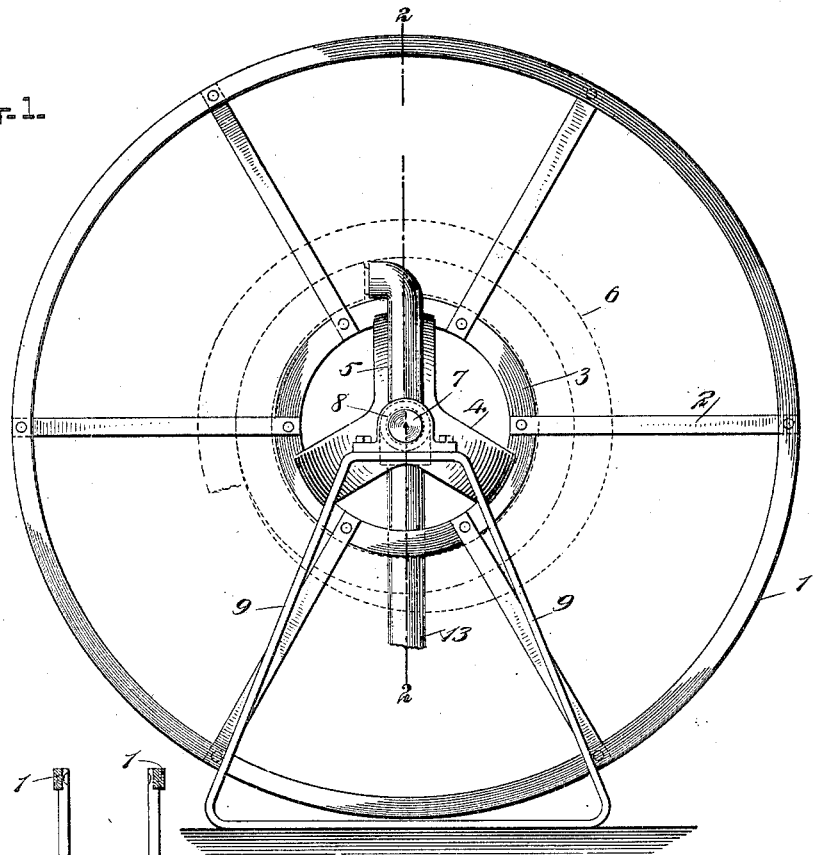
Figure 2:
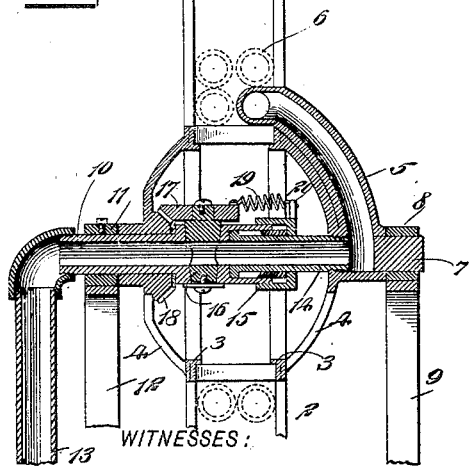
Figure 3:
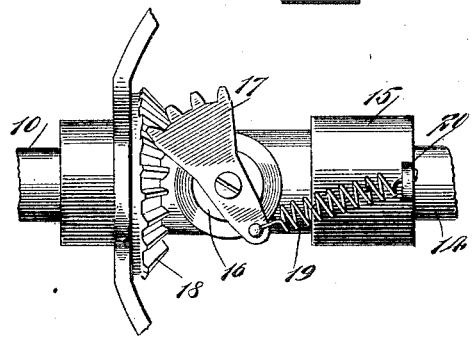

Figure 1 is a side elevation of a hose-reel embodying my invention. Fig. 2 is a section on the line 2 2 of Fig. 1, and Fig. 3 is a plan view showing the valve-operating mechanism.

The reel comprises outer rims 1, connected by spokes 2 with a ring-like hub 3, having spiders or arms 4 at the ends. At one side of the hub a pipe 5 is formed, which extends into the space between opposite spokes 2, where it is designed to be connected with a hose 6. At the end of the hub where the pipe 5 is located a journal 7 is provided, which has a bearing in a boxing 8, supported on legs 9. The opposite side of the hub is mounted to rotate on a feed-pipe 10, rigidly secured in a boxing 11, supported on legs 12.

A supply-pipe 13 connects with the outer end of the pipe 10, and communicating with the inner end of the said pipe 10 is a tube 14, which also communicates with the pipe 5. This tube 14 is designed to rotate with the reel. I have here shown it as having screw-thread engagement with one of the spiders 4, and to prevent leakage a stuffing box or gland 15 is connected to the tube 14 and to the pipe 10.

Arranged in the pipe 10 is a plug-valve 16, on the stem of which is secured a segment-rack 17, adapted for engagement with the teeth of a bevel-gear 18, arranged in the hub. From the opposite end of the segment-rack 17 a spring 19 extends to a connection with a pin 20, attached to the stuffing-box 15.

In operation the pipe 13 is designed to be attached to a hydrant or other supply of water under pressure. Then as the hose is drawn off the reel will be rotated, and during this rotation the gear 18, engaging with the segment-rack 17, will turn the same to rotate the valve 16 to its open position, as indicated in Fig. 2. Therefore the water may pass from the pipe 13 through the pipe 10, the tube 14, the pipe 5, and the hose. After the hose shall have been drawn out sufficiently to open the valve it may be farther drawn out without moving the valve, because the teeth of the rack 17 will be out of engagement with the wheel 18. When the reel is turned to wind the hose thereon, the gear 18, engaging with the rack 17, will move it in a direction to close the valve, thus shutting off the water-supply to the hose.

Having thus described my invention, I claim as new and desire to secure by Letters Patent—

1. A hose-reel, a pipe attached to the hub portion of said reel and adapted for connection with a hose, a tube connected to the hub portion of the reel and communicating with said pipe, a fixed pipe for discharging water into said tube, a valve in the fixed pipe, a segment-rack attached to the stem of said valve, a bevel-gear attached to the hub of the reel, and adapted for engagement with said rack, and a spring extended from said rack to a stationary support, substantially as specified.

2. A hose-reel, comprising outer rims, a hub to which said rims are attached, a pipe attached to one side of the hub and having its end extended into the reel for connection with a hose, a tube extended axially of the hub and communicating with the pipe, another tube communicating with the first-named tube and upon which the hub is mounted to rotate, a valve in said other tube, and means operated by a rotation of the reel for opening and closing said valve, substantially as specified.

In testimony whereof I have signed my name to this specification in the presence of two subscribing witnesses.

GEORGE REED YOUNG.

Witnesses:
JNO. M. PRESCOTT,
H. M. THOMAS.